Jan. 24, 1950 H. E. SCHLEICHER 2,495,608

OVERLOAD PROTECTIVE DEVICE

Original Filed Nov. 26, 1943 2 Sheets-Sheet 1

Inventor—
Harold E. Schleicher
by his Attorneys
Howson and Howson.

Jan. 24, 1950 H. E. SCHLEICHER 2,495,608

OVERLOAD PROTECTIVE DEVICE

Original Filed Nov. 26, 1943 2 Sheets-Sheet 2

Inventor:
Harold E. Schleicher
by his Attorneys
Howson and Howson.

Patented Jan. 24, 1950 2,495,608

UNITED STATES PATENT OFFICE 2,495,608

OVERLOAD PROTECTIVE DEVICE

Harold E. Schleicher, West Hartford, Conn., assignor to The Arrow-Hart & Hegeman Electric Company, Hartford, Conn., a corporation of Connecticut Original application November 26, 1943, Serial No. 511,855. Divided and this application March 23, 1945, Serial No. 584,301

14 Claims. (Cl. 200—116)

This invention relates to electric switches, particularly switches used as overload relays to control the operation of other switches for heavier duty such as electro-magnetically actuated switches for controlling power line circuits.

Modern battle conditions require electrical control apparatus to withstand high impact shocks. These requirements have been met by newly invented balanced types of electro-magnetically operated switches such as disclosed in my co-pending application Serial No. 511,855 entitled "Rotary magnetic switch," filed November 26, 1943, of which this application is a division. Such switches will remain closed even when subjected to enormous shocks and vibrations.

Overload protective devices used in connection with these newly invented electro-magnetic switches necessarily must perform under the same conditions as those switches. Hence, the protective devices, like the main switch, must be constructed to dominate those conditions.

Thus it is an object of the invention to provide overload protective devices for use with, and under the same conditions as, balanced shock-proof electro-magnetic switches of the aforementioned type.

Another object is to provide overload protective devices embodying shockproof features and in which the principles of dynamic balance are observed and incorporated, in order (1) to preserve the effectiveness of the incorporation of those same principles in associated devices and (2) to insure (whether or not the associated devices are constructed on and embody balanced and shockproof principles) accurate operation of the protective devices and their operation only at the time and under the desired predetermined conditions.

Other objects and advantages will become apparent as the invention is described in connection with the accompanying drawings.

In the drawings—

The present invention in overload protective devices is particularly useful in military installations where sudden severe shocks and vibrations are likely to occur at anytime. The invention is furthermore, particularly suited for use with balanced switching devices such as the rotary electromagnetic switch of my co-pending application Serial No. 511,855, and has been designed and formed in its various parts to fit alongside and to be a unit or section of the complete structure illustrated and described in said co-pending application. However, the present invention, in both structure and principle, is capable of use in many other situations and fields, with little or no change in form.

When conditions of use require a balanced switching device of the type, for example, as in my application Serial No. 511,855, equally important in the protective end of the device is the need to prevent actuation, when shocks occur, for unless the overload or protective devices be shock-proof, they may operate under shock conditions to trip the breaker open in spite of all precautions taken in making the breaker itself shock-proof.

Generally, such devices as are herein contemplated are used in three wire power line systems and must be capable of breaking the circuit on overload occurring in either of the two outside lines, the neutral not being directly and separately protected.

The overload protective devices themselves are mounted upon a molded insulation mounting disc 130 which is suitably and symmetrically recessed at various points and places on each side of a vertical axis of symmetry for the individual elements which make up the dual protective devices.

Figures 1, 2:
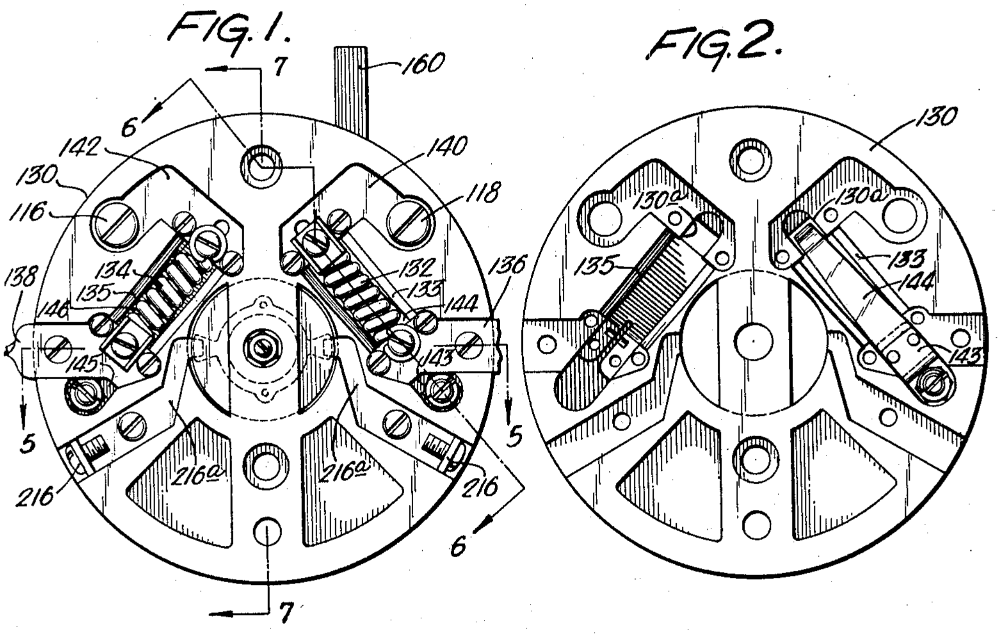
Fig. 1 is a plan view looking into one face of a switch section embodying the invention.
Fig. 2 is a view similar to Fig. 1 but with the heater coils and fixed control contacts removed.
Figure 6:
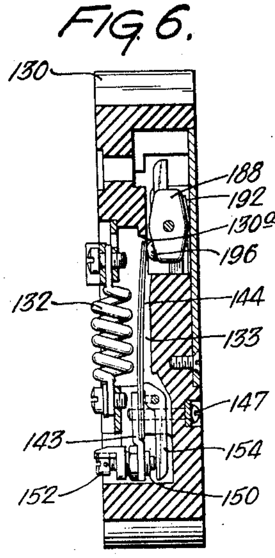
Fig. 6 is a section view taken transversely along line 6—6 of Fig. 1.
Figure 7:
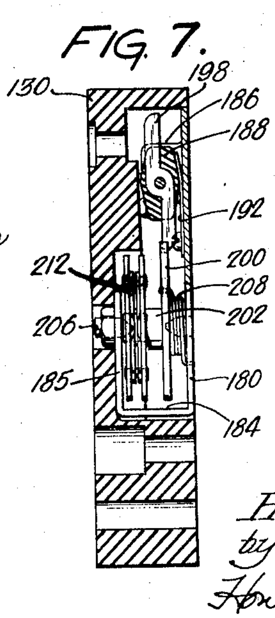
Fig. 7 is a section view taken along line 7—7 of Fig. 1.

On one side of the mounting disc 130 are mounted the heater coils and bimetallic strips (see Figs. 1 and 2); on the other side (see Figs. 3 and 4) is mounted the balanced tripping mechanism which controls a rotary switch connectible in the circuit to be protected, for example, an electro-magnetic circuit so as to accomplish de-energization of the magnet and resultant circuit opening movement of a magnetic switch. The tripping mechanism is a removable unit (see Fig. 8 wherein it is removed) which can be tripped by the action of bimetallic strips 144 and 145 responsive to heat developed on overload in resistance wire coils 132, 134 carrying main line current and placed next to the bimetallic strips.

Outside connections to the heater coils are made through identical stamped sheet metal terminal members 136, 138 mounted in diametrically opposite radially directed recesses at the periphery of the mounting disc 130 having their terminal portions, such as 136*a*, extending beyond. To accommodate the heater coils and bimetal members, oblique channels 133, 135 convergent from the inner ends of the terminal members 136, 138 are formed in the mounting disc. At the inner ends of these channels, L-shaped stamped sheet metal connectors 140, 142 form a mounting to which one end of the heater coils is secured, their opposite ends being screwed to the terminals 136, 138, whereby the coils are positioned in the upper part of the channels. Electric connection of the heaters 132, 134, for example, to the outside lines of a three wire system, may be made by terminal bolts 118 and 116 respectively.

Located beneath, and substantially parallel to the axis of the heaters 132, 134 are bimetal strips 144, 146 mounted at one end on small brackets 143, 145. The brackets are each secured at one end to the mounting disc 130 by through bolts 147.

To adjust the bimetal strips one end of the bimetal supporting brackets 143 receives a screw bolt 150, which is bored through and internally threaded to receive a calibration compensating screw 152 that engages one end of a lever 154 pivotally mounted near one end in the disc 130. The other end of the lever engages the under surface of the bimetal so that on turning the adjustment bolt and screw the lever is rocked to vary the position of the bimetal with resultant variation in the amount of flexure thereof that will cause the latch 188 to trip free of the latch disc 200. Suitable locking means, as shown, are provided to maintain the position of adjustment of the screw 152 and bolt 150.

In order that the bimetal strips may act on the tripping mechanism on the opposite side of the mounting disc 130, the disc is pierced with openings 130*a* (Figs. 4 and 2) beneath the free ends of the bimetal strips at the end of the channels 133, 135, where the connectors 140, 142 are. As the bimetal strips flex on overload, their ends (one or both) enter the openings 130*a* to engage buttons 196 on the trigger member of the tripping mechanism now to be described.

Figure 9:
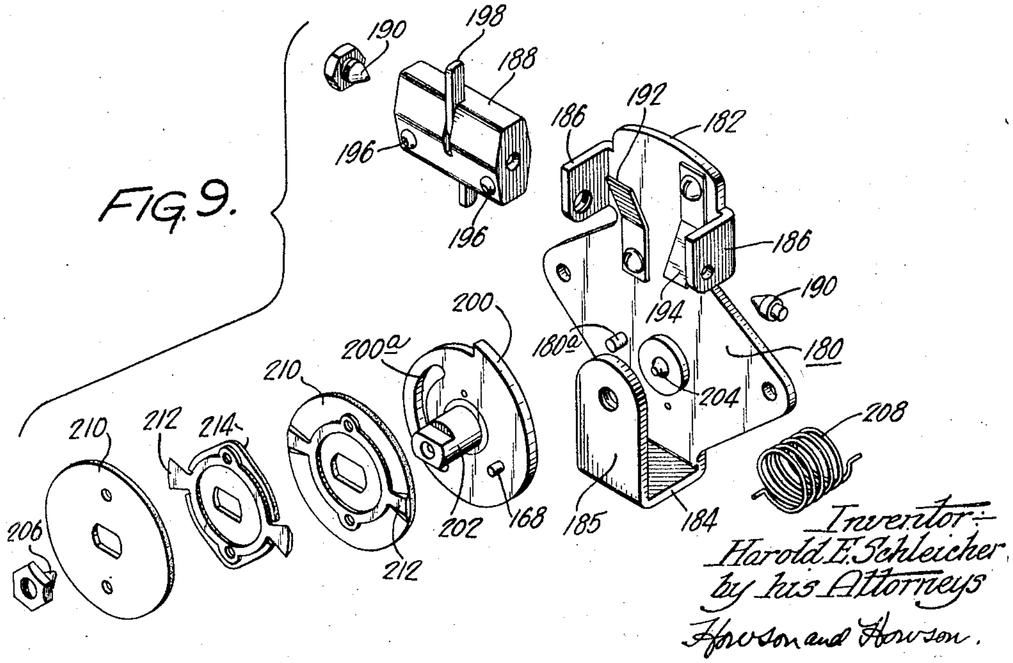
Fig. 9 is an exploded perspective view of the tripping mechanism of Fig. 8.

The tripping mechanism is carried by a frame that may be stamped from sheet metal in the form best indicated in Fig. 9. The central portion of this frame 180 is in the form of a parallelogram, from the opposite corners of which there are extensions 182, 184. The extension 182 has lateral arms or lugs 186 bent up at right angles thereto, between which is located the dynamically and statically balanced pivoted trigger member 188 which is preferably formed from molded insulating material into hexagonal prismatic form. In order to resiliently maintain the trigger member in a neutral position, obliquely-angled leaf spring members 192, 194 each have one arm lying upon and screwed to the face of the frame 180, while the other arm extends obliquely upward to engage converging adjacent faces of the trigger member 188. On the opposite side of the trigger member from said converging faces semispherical buttons or nubs 196 are located near the ends of the trigger in position to be engaged by the ends of the one or the other of the bimetallic members. Thus, when either of the bimetallic members bend and press against either of the nubs or heads 196, the trigger member 188 will be caused to pivot. In the central portion of the trigger member is molded a balanced tripping member which is balanced by having similar fingers such as 198 extending in opposite directions. The finger 198 extends radially of the pivotal axis beyond the surface of the tripping member in position to be engaged by the radial shoulder on a dynamically balanced rotary latch disc 200 which is driven onto, keyed to, or otherwise secured to, a stud shaft 202. To afford support for bearings for the stud shaft 202, the frame 180 has its extension 184 turned up at right angles to the central section of the frame 180 and its end 185 again turned at right angles so as to lie parallel to the central section 180. Conical bearing holes are formed in the end of the stud shaft 202 to receive the conical bearing member 204 located in the central portion of the frame 180 and to receive the conical end of a journal pin 206 which is screw-threaded into an aperture in the arm 185 co-axial with the conical bearing member 204. The pin 206 may be adjusted to remove all excess play and prevent movement under impact.

In order to bias the latch disc 200 in one direction normally, a coil spring 208 is placed around the end of the stud shaft 202 with one end of the spring 208 anchored in the frame 180, and the other anchored in the latch disc. In order to limit the rotation of the latch disc, an arcuate recess 200*a* is formed adjacent the periphery thereof and extending through an angle of approximately 60 degrees. A pin 180*a* affixed in the central portion of the frame 180 extends up into the aperture 200*a* and acts as a stop to limit the rotation of the latch disc 200.

Figure 5:
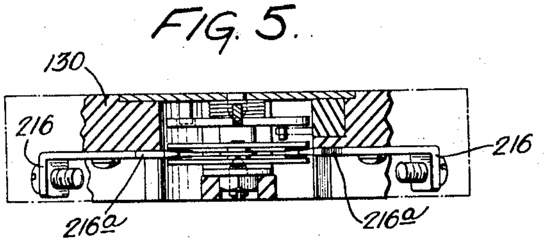
Fig. 5 is a section view taken along line 5—5 of Fig. 1.

Carried by the stud shaft 202 at its end, is a movable self-aligning contact member made up of a pair of insulating discs 210, between which and to which are riveted a pair of bridging contact members 212 having the form illustrated in Fig. 9, namely a ring-shaped portion with diametrically opposite apertures for the rivets and with contact blades diametrically opposite each other but spaced 90 degrees from the rivet holes. An insulating spacer disc 214 is placed between the two bridging contact members, so that the blades of the members may engage opposite sides of fixed contact fingers 216*a* (see Figs. 1 and 5). These fingers 216*a* extend radially inward as extensions from contact and terminal members 216 that may conveniently be stamped from highly conductive sheet metal into the oblique form shown in Fig. 1. The members 216 are bolted to the mounting disc 130 in symmetrical positions of the axis of symmetry on opposite sides. Recesses having the same form and shape as the members 216 are provided for embedding said members in the base of the mounting disc 130. The outer ends of the members 216 are bent to provide terminal lugs, which are provided with terminal screws in conventional fashion.

In order to reset the thermal-overload opened contacts 212 into position to bridge the contacts 216*a*, there is provided a resetting button in the form of a depressible insulating bar 160 sliding in a rectilinear tangential passage 162 in the disc 130. A spring 164 in the bottom of passage 162 urges the button outwardly of the passage; and a laterally extending arm 166 near the inner end of the button is positioned to engage a pin 168 extending up from the surface of the latch disc 200. When the button is depressed, the engagement of arm and pin causes rotation of the latch disc 200 against the urge of spring 208 until the finger 198 falls back of the shoulder on the latch disc to hold said disc latched. In that position the contacts 212 and 216 are engaged.

From the foregoing description of the parts, it may be observed that when either one or the other of the heater coils becomes overheated by excess current, it will cause one or the other of the bimetallic members to bend, so that its end engages and turns the trigger member 188, causing its tongue or extension 198 to disengage the shoulder on the latch disc 200 (the positioning springs 192 and 194 for maintaining the latching member 188 in neutral position are not of sufficient strength to interfere with the overload operation of the bimetallic member). As soon as the latch disc 200 is free, the spring 208 will cause it to rotate. Since the stud shaft 202 turns with the latch disc, the movable contact structure will also turn with it and the bridging contact member 212 thereof will thereupon disengage the fixed contact members to break the control circuit. In conventional practice, the contacts controlled by this tripping mechanism will be in the holding circuit of the electromagnet and their disengagement will cause the energization of the electromagnet coil, whereupon under the influence of the biasing spring the electromagnet contacts and the shaft on which they are mounted will rotate into open circuit position, causing the switch to open.

Figures 3, 4, 8:
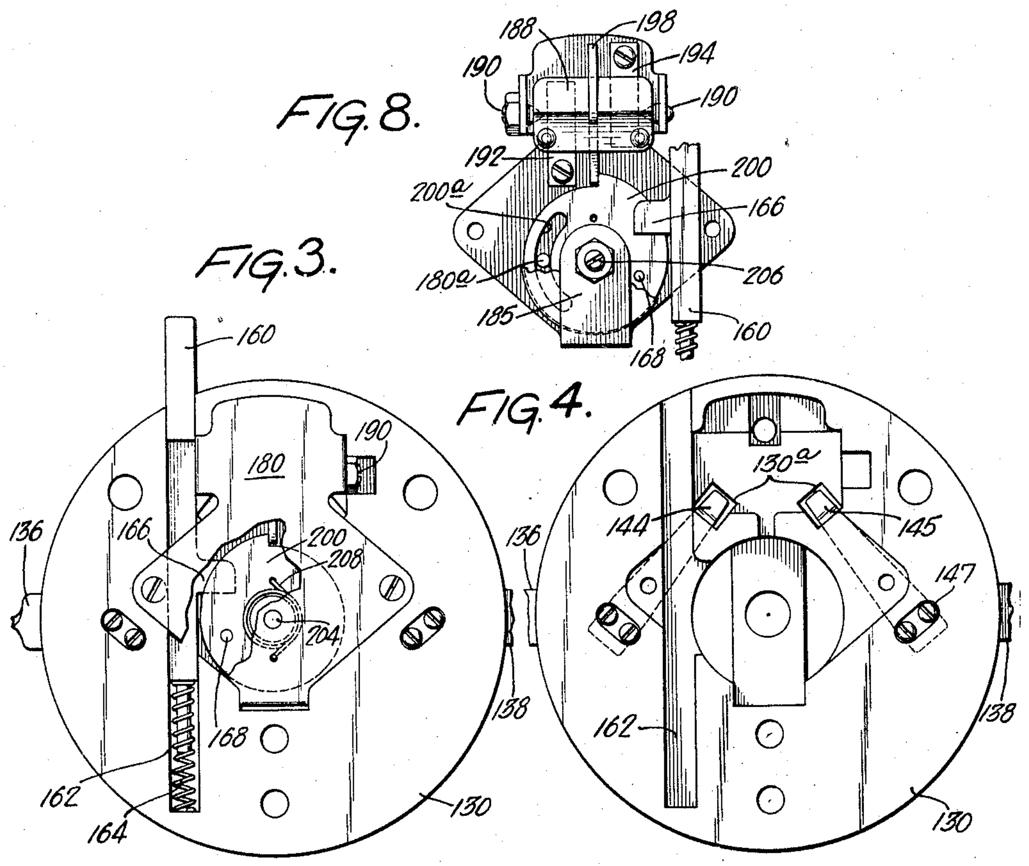
Fig. 3 is a plan view looking in the opposite face of the device of Fig. 1.
Fig. 4 is a view similar to Fig. 3, with some of the tripping mechanism and its resetting means removed.
Fig. 8 is a detail view showing in elevation tripping mechanism that was removed from Fig. 4.

Referring to Figs. 8 and 9, it will be observed that the pivots 190 of the trigger member 188 are widely spaced, being approximately the same distance from the finger 198 as the point of engagement of the latch member 200 with said finger is from the axis of the trigger member 188. By this wide spacing of the pivots, the friction by the pivots 190 is less than it would be if these pins were more closely spaced and provided a shorter force arm, i. e. distance from the finger 198 to either pin 190. Thus the friction created by the biasing effort of spring 208 is held down to practical elements.

The dynamic balance of movable parts is carried out in the overload devices by the structure of the trigger 188 with its oppositely-extending mutually balancing fingers 198 and the springs 192, 194 which balance it in latching position, and in the balanced rotary contact structure 210, 212, 214 in which, also, the stationary contacts are engaged on both sides so as to prevent momentary disengagement due to shock occurring in an axial direction.

Many modifications within the scope of the invention will occur to those skilled in the art. Therefore I do not limit the invention to the embodiment disclosed.

I claim:

1. Overload relay mechanism for electric switches comprising an insulating disc centrally recessed for reception of control contact mechanism, rotary switch mechanism biased toward open-circuit position and embodying latching means for holding said switch mechanism in closed-circuit position, said switch mechanism and latching means being mounted on one side of said disc, plural overload responsive means mounted on the opposite side of said disc and engageable with said latching means to trip the same on occurrence of overload conditions affecting any of said overload responsive means, and manual resetting means extending outside the disc for resetting said switch mechanism.

2. Overload relay mechanism for electric switches as claimed in claim 1 wherein said switch mechanism is mounted and may be dismounted as a unit without affecting said overload responsive means.

3. Overload relay mechanism for electric switches comprising an insulating disc centrally recessed for reception of control contact mechanism, rotary switch mechanism mounted on one side of said disc and biased toward open-circuit position and embodying latching means for holding said switch mechanism in closed-circuit position, plural overload responsive means mounted on the opposite side of said disc and engageable with said latching means to trip the same on occurrence of overload conditions affecting any of said overload responsive means and manual resetting means extending outside the disc for resetting said switch mechanism and held slidably in a passageway in said disc by said switch unit.

4. Overload relay mechanism for electric switches comprising a frame having spaced parallel plate portions, a rotary contact, a shaft carrying said contact and having its ends pivotally mounted in said parallel frame portions, a latch member biased to open-circuit position, a trigger member pivotally mounted on said frame and holding said latch member, overload responsive means engageable with said trigger member to release said rotary contact, said trigger member exerting its holding action on said latch member independently of said overload member.

5. Overload relay mechanism for electric switches comprising a frame, a rotary contact, a shaft carrying said contact and having its ends pivotally mounted in parts of said frame, a latch member biased to open-circuit position, a trigger member pivotally mounted on said frame and holding said latch member, overload responsive means engageable with said trigger member to release said rotary contact, said trigger member exerting its holding action on said latch member independently of said overload member, and manual actuating means separate from said rotary contact for resetting said mechanism.

6. Overload relay mechanism for electric switches comprising a frame, a rotary contact, a shaft carrying said contact and mounted within said frame, a latch member biased to open-circuit position, a trigger member pivotally mounted on said frame and holding said latch member, means holding said trigger member resiliently in a predetermined latching position, overload responsive means independent of said trigger holding means engageable with said trigger member to release said rotary contact, said trigger member exerting its holding action on said latch member independently of said overload member.

7. Overload relay mechanism for electric switches comprising a frame, a rotary contact, a shaft carrying said contact and mounted between parallel portions of said frame, a latch member biased to open-circuit position, a trigger member pivotally mounted on said frame and holding said latch member, means holding said trigger member resiliently in latching position, plural overload responsive devices engageable with said trigger member to release said rotary contact, said trigger member exerting its holding action on said latch member independently of said overload responsive devices.

8. A balanced shockproof relay switch, comprising a stamped sheet metal frame, a shaft pivotally mounted in said frame, a balanced rotary contact on said shaft, fixed contact means engaged thereby, thermally responsive means to control said rotary contact, biasing means on said shaft for said rotary contact, and balanced latching means mounted on said frame holding said rotary contact against said bias and operated by said thermal means, all said parts except said fixed contacts and said thermal means being supported from said frame to provide an integral unit.

9. A balanced shockproof relay switch, comprising a stamped sheet metal frame, a shaft pivotally mounted in said frame, a balanced rotary contact on said shaft, fixed contact means having interleaved engagement with said rotary contact to prevent momentary separation of said contacts in case of sudden lateral impact, thermally-responsive means to control said rotary contact, biasing means for said rotary contact, balanced latching means including a balanced trigger member normally holding said latching means and rotary contact and operable by said thermal means to release said contact, all said parts except said fixed contacts and said thermal means being supported from said frame to provide an integral unit.

10. A balanced relay switch comprising a balanced movable contact, fixed contact means engaged thereby, means biasing said movable contact, latching means holding said movable contact against said bias, and rotary trigger means engaged by said latching means and balanced about its pivotal axis in shockproof condition, plural spring means acting on said trigger in opposite directions to bias it in a central position while mantaining its condition of balance.

11. A balanced relay switch, fixed and movable contact means, rotary latching means for holding said movable contact means, biasing means for said latching means, pivoted trigger means engaging said latching means and movable at right angles to the plane of movement of said latching means to minimize transmission of forces, the pivots of said trigger means being separated to reduce frictional resistance in its pivotal mounting incident to the force which the biasing and latching means exert on said trigger means.

12. A balanced shockproof overload relay comprising a recessed insulating disc having on one side a rotary switch unit and on the other side plural overload responsive and thermal means, said rotary switch unit comprising a frame, a pivotally mounted rotary balanced contact, a latch, biasing means for said contact and latch, a balanced trigger means pivotally mounted upon said frame and engageable with said latch, resilient means to statically balance said trigger means in latched position, said overload responsive means comprising separate cantilever type bimetals acting on said trigger means, said thermal means being connectible to power lines to effect said overload responsive means, said overload and thermal means being separately assembled in one recess of said disc, stationary contact means mountable in and engageable by said rotary contact in latched position, reset means mountable on disc engageable with, but nevertheless movable independently of, said latch to cause re-engagement of the latch and trigger.

13. A balanced shockproof overload relay comprising a centrally recessed insulating disc having on one side a rotary switch unit and on the other side a plural overload responsive means, said rotary switch unit comprising a frame, a pivotally mounted rotary balanced contact and latch assembly, biasing means for said contact and latch assembly, balanced trigger means pivotally mounted upon said frame and engageable with said latch assembly resilient means to statically balance said trigger means in latching position, said overload responsive means comprising separate cantilever type bimetals, fixed contact means engaged by said rotary contact, and reset means mountable on said disc and engageable with said latch to re-engage it with the trigger.

14. A balanced shockproof overload relay comprising a recessed insulating disc having on one side a rotary switch unit and on the other side plural overload responsive means, said rotary switch unit comprising a frame, a pivotally mounted rotary balanced contact, a latch, biasing means for said contact and latch, a balanced trigger pivotally mounted upon said frame and engageable with said latch, resilient means to statically balance said trigger in latched position, said overload responsive means comprising separate cantilever type bimetals acting on said trigger means, stationary contact means mountable in said disc and engageable by said rotary contact in latched position, reset means mountable on said disc and engageable with, but nevertheless movable independently of said latch to cause re-engagement of the latch and trigger.

HAROLD E. SCHLEICHER.

REFERENCES CITED

The following references are of record in the file of this patent:

UNITED STATES PATENTS

| Number | Name | Date |
|---|---|---|
| 652,601 | Dodds | June 26, 1900 |
| 1,328,481 | Baker | Jan. 20, 1920 |
| 1,701,440 | Chatto | Feb. 5, 1929 |
| 1,736,372 | Sachs | Nov. 19, 1929 |
| 1,740,911 | Todd | Dec. 24, 1929 |
| 2,067,797 | Smith | Jan. 12, 1937 |
| 2,089,716 | Smith | Aug. 10, 1937 |
| 2,416,163 | Dyer | Feb. 18, 1947 |